United States Patent [19]

Belart

[11] Patent Number: 4,681,375
[45] Date of Patent: Jul. 21, 1987

[54] HYDRAULIC BRAKE SYSTEM FOR AUTOMOTIVE VEHICLES

[75] Inventor: Juan Belart, Walldorf, Fed. Rep. of Germany

[73] Assignee: Alfred Teves, Frankfurt, Fed. Rep. of Germany

[21] Appl. No.: 722,719

[22] Filed: Apr. 11, 1985

[30] Foreign Application Priority Data

Apr. 11, 1984 [DE] Fed. Rep. of Germany ....... 3413626

[51] Int. Cl.$^4$ .......................... B60T 8/02; B60T 13/14
[52] U.S. Cl. ..................................... 303/114; 60/545; 60/547.1; 303/119
[58] Field of Search ................. 303/114, 116, 119, 93, 303/50-56, 6 R, 6 A, 89; 188/181 A, 345, 358, 359, 355, 353, 265; 60/545, 547.1, 548, 550, 552, 553, 554, 568, 569, 581, 584, 592

[56] References Cited

U.S. PATENT DOCUMENTS

| | | |
|---|---|---|
| 4,354,714 | 10/1982 | Belart ................................. 303/114 |
| 4,482,190 | 11/1984 | Burgdorf et al. ............... 303/119 X |
| 4,483,144 | 11/1984 | Steffes .............................. 60/591 X |

*Primary Examiner*—Douglas C. Butler
*Attorney, Agent, or Firm*—James B. Raden

[57] ABSTRACT

A hydraulic brake system for automotive vehicles provided with a hydraulic power booster (1) and with a master cylinder (10) operable by the power booster (1). The booster piston (2) is designed as stepped piston with a pedal-close portion (5) of smaller diameter and with a pedal-remote portion (6) of larger diameter. Together with a housing (11), the annular surface (12) of the booster piston (2) at the piston step encloses an annular space (13) of variable volume. The annular space (13) communicates with an unpressurized supply reservoir (22), which communication may be locked, and wherein in a pedal-remote pocket bore (7) of the booster piston (2) a master cylinder piston (8) confining a working chamber (17) is guided in a sealed manner. An annular chamber (14) confined by the pedal-remote annular surface of the booster piston (2) is pressurizable by the pressure of an auxiliary pressure source. A hydraulic communication is establishable between the annular chamber (14) and the working chamber (17) by way of a non-return valve (57) which opens towards the working chamber (17). With respect to a prefill of the brake system at the beginning of the braking operation a double-seat valve (41) between the annular chamber (14) and the unpressurized supply reservoir (22). The double-seat valve (41) temporarily adopts a locking position at the beginning of the braking operation.

13 Claims, 1 Drawing Figure

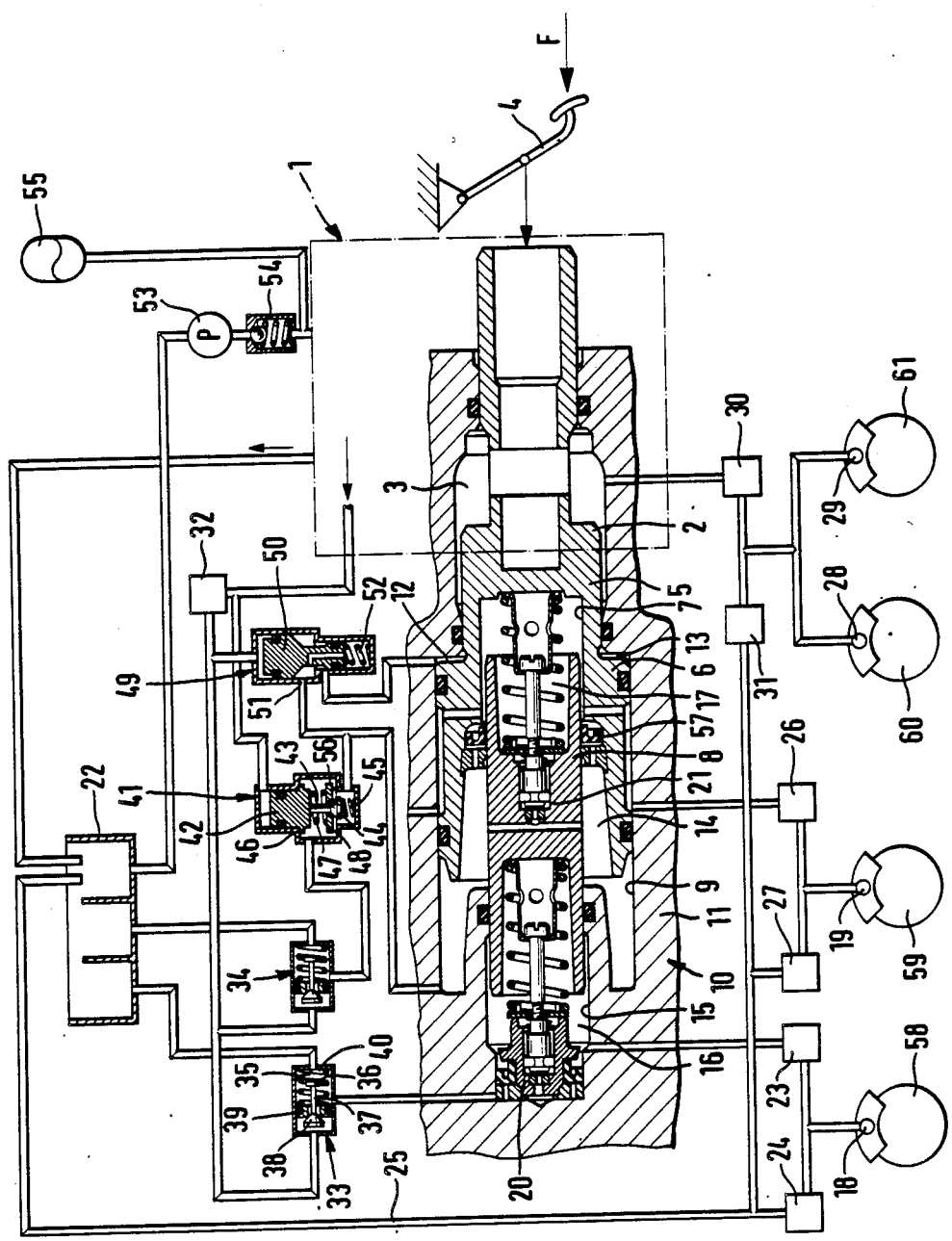

HYDRAULIC BRAKE SYSTEM FOR AUTOMOTIVE VEHICLES

BACKGROUND OF THE INVENTION:

This invention relates to a hydraulic brake system for automotive vehicles which is provided with a hydraulic power booster and a master cylinder operable by the power booster. The booster piston is designed as a stepped piston with a pedal-close portion of smaller diameter and a pedal-remote portion of larger diameter. Together with a housing, the annular surface of the booster piston at the piston step encloses an annular space of variable volume. The annular space communicates with an unpressurized supply reservoir, which comunication can be locked, wherein in a pedal-remote pocket bore of the booster piston a master cylinder piston is guided in a sealed manner which confines a working chamber. An annular chamber confined by the pedal-remote annular surface of the booster piston is pressurized by an auxiliary pressure source with a hydraulic communication being established between the annular chamber and the working chamber by way of a non-return valve which opens towards the working chamber.

The above characteristics are generally described in German patent application No. P3328104.1. In the brake system described more fully herein, a booster piston is provided whose pedal-close effective surface is pressurized by a pressure which is proportional to the respective actuating force exerted on the brake pedal. At the pedal-remote end surface of the booster piston a stepped piston is supported whose pedal-remote end surface has a pocket bore. In the pocket bore a master cylinder piston is slidingly guided while being sealed. The stepped piston has a pedal-close portion of smaller diameter and a pedal-remote portion of larger diameter.

Between the piston portions an annular surface results which, in coordination with the housing, confines a circumferential annular space communicating with an unpressurized supply reservoir by way of a shut-off valve. The pedal-remote annular surface of the stepped piston confines a circumferential annual space communicating with this space by way of a throttle device. Moreover, by way of a further valve device, there exists a communication between the circumferential annular space confined by the pedal-remote end surface of the stepped piston and the unpressurized supply reservoir-- -which communication may be locked. The further valve device is designed as double-seat valve and locks communication towards the unpressurized supply reservoir upon appropriate pressurization.

Upon pressurization of the additional valve device, and simultaneously with the locking action towards the unpressurized reservoir, there is established a hydraulic communication between a pressure source and the circumferential annular space confined by the pedal-remote annular surface of the stepped piston. The result of such pressurization of the circumferential annual space is that pressure medium which, if necessary, was tapped from the working chamber will be filled up by way of a gasket arranged between the stepped piston and the master cylinder piston, thus a minimum volume reserve of the working chamber is ensured.

In the brake system described in the previously identified German patent application provision is made for communication between the annular space confined by the pedal-remote end surface of the stepped piston and the annular space confined by the piston step and which may be locked in dependence on the travel of the stepped piston so that a limitation of the pedal stroke as a function of the travel covered by the stepped piston results.

In certain applications it is advantageous for an automotive brake system to have a so-called "prefill effect" which means that, at the beginning of the braking operation, a relatively large piston surface is effective temporarily, and, thus the required absorption volume is supplied relatively fast in the initial phase of braking. Such a measure is not provided in the brake system described in the above mentioned patent application. It is therefore an object of the present invention to further develop a brake system of the type described so as to ensure that the required absorption volume is introduced into the brake circuits at the beginning of a braking operation.

SUMMARY OF THE INVENTION

According to the present invention, this object is achieved in that a double-seat valve is arranged between the annular chamber and the unpressurized supply reservoir, with the double-seat valve temporarily adopting a locking position at the beginning of the braking operation. As soon as the double-seat valve assumes a locked positionn at the beginning of the braking operation, the annular chamber confined by the pedal-remote annular surface of the booster piston is locked hydraulically. Upon a displacement of the booster piston the volume of the annular chamber is diminished, the pressure increase being relatively small and the surplus volume being drained, by way of the non-return valve, towards the working chamber of the master cylinder. In this operating condition, a relatively large surface of the booster piston is effective. By way of the owrking chamber, the volume displaced from the annular chamber will reach the brake actuating devices connected to the working chamber and ensure that the brake circuits are completely filled with pressure medium. In an advantageous embodiment of the present invention, the double-seat valve is controllable by the pressure established in the pressure chamber of the hydraulic power booster. In this embodiment the double-seat valve adopts a locking position as soon as an actuating force is exerted on the brake pedal or a corresponding hydraulic pressure results in the pressure chamber of the hydraulic power booster. Once the pressure of the pressure chamber of the hydraulic power booster exceeds a predeterminable level, the double-seat valve comes into an open position in which the annular chamber confined by the pedal-remote annular surface of the booster piston again communicates with the unpressurized supply reservoir. The volume displaced from this annular chamber can flow off towards the unpressurized supply reservoir by way of the open double-seat valve.

To guide a valve piston in a sealed manner within a bore of the double-seat valve, the valve piston is pressurized by the pressure of the pressure chamber of the hydraulic power booster. This forms a first valve seat with the end surface of the valve piston which is averted from the pressure-applied surface and which is under the action of a force of a first compression spring said valve seat keeping a closure member at a distance with respect to a second valve seat in the brake's release position. A second compression spring is fixed between the valve piston and the closure member. By means of said second compression spring the closure member and the valve piston are bound together. The second compression spring expediently has a steeper characteristic line than the first compression spring. Thus, due to the spring rating ratio there results a pressure range in the pressure chamber of the hydraulic power booster which decisively determines the prefull of the brake system. In this connection it is advantageous to limit the travel of the valve piston by axial stops. Thus, in the brake's release position, a defined axial position of the valve piston results because of the forces of the compression springs.

In a further development of the double-seat valve the space of the double-seat valve which accommodates the compression springs communicates with the unpressurized supply reservoir by way of an inlet valve. It is further provided that, by way of the inlet valve, the space accommodating the compression springs is pressuirzable by the pressure prevailing in the pressure chamber of the hydraulic power booster. By such a design, on the one hand, it is achieved that the annular chamber confined by the pedal-remote annular surface of the booster piston communicates with the unpressurized supply reservoir in the brake's release position. Upon actuation of the inlet valves, on the other hand, it is ensured that the respective annular chamber communicates with the unpressurized supply reservoir. Hydraulic communication between the annular chamber confined by the pedal-remote annular surface of the booster piston and the unpressurized supply reservoir thus is locked solely in the initial phase of braking. An advantageous further development of the present invention provides that a 2/2-way valve (preferably electromagnetically controllable by slip control electronics) is arranged between the pressure chamber of the hydraulic power booster and the inlet valve so that the inlet valve switches over as soon as a critical slip is registered at any one of the vehcile wheels controlled by the slip control electronics.

The automotive brake system of the present invention may advantageously be designed such as to allow the pedal-remote end of the master cylinder piston to be plunged into a further working chamber. In this way a master cylinder is obtained which has two working chambers each of which may be used for the pressure supply of a separate brake circuit. Thus a simple multicircuit brake system is obtained which has important advantages in terms of safety as compared to a one-circuit system. Two wheel brakes of a first brake circuit are connectable to the first working chamber of the master cylinder and two wheel brakes of a second brake circuit are connectable to the second working chamber, with the first working chamber hydraulically communicating with wheel brakes of a first vehicle's axle and the second working chamber communicating with wheel brakes of a second vehicle's axle. On the other hand, two diagonally opposite wheel brakes at a time can be connected to one working chamber. Each of the working chambers may be connected with one wheel brake arranged at the front axle of an automotive vehicle and the wheel brakes of the rear axle can hydraulically communicate with the pressure chamber of the hydraulic power booster. With such a split-up of the brake circuits a brake system is obtained which provides safety in case of circuit failure. The described brake system may be modified with respect to a brake slip control system wherein valve means are connected upstream of the wheel brakes which preferably are eletrically actuatable and by means of which the pressure in the wheel brakes may be modulated independently of the master cylinder pressure.

BRIEF DESCRIPTION OF THE DRAWING

One embodiment of this invention will be explained in more detail in the following detailed description, reference being made to the single drawing FIGURE which provides a system diagram of a brake system.

DETAILED DESCRIPTION

In the drawing, the reference numeral 1 designates a hydraulic power booster wherein a booster piston 2 faces a pressure chamber 3. By the application of a force to a brake pedal 4 a hydraulic pressure may be established in the pressure chamber 3 of the hydraulic power booster by way of a brake valve not shown in the drawing, said pressure corresponding to the respective actuating force F. The booster piston 2 is designed as stepped piston and has a piston portion 5 of smaller diameter and a piston portion 6 of larger diameter. The piston portion 5 of smaller diameter faces the brake pedal 4. The pedal-remote end of the booster piston 2 has a pocket bore 7 wherein a master cylinder piston 8 is slidingly guided while being sealed. The outside circumference of the piston portion 6 of larger diameter is guided in a sealed manner within a cylinder bore 9 of a master cylinder 10. The master cylinder 10 includes a housing 11. Together with the housing, an annular surface 12 resulting between the piston portions 5, 6 encloses an annular space 13 of variable volume. Coordinating with the master cylinder housing 11 and the master cylinder piston, the pedal-remote annular surface of the booster piston 2 confines an annular chamber 14. Moreover, the master cylinder piston 8 is guided in a sealed manner within a section 15 of the cylinder bore 9. In this way, two working chambers 16, 17 are formed within the master cylinder 10, each of the working chamber 16, 17 being connected with one wheel brake 18, 19 of an automotive vehicle. In the brake's release position, the working chamber 16, 17 are communicating with an unpressurized supply reservoir 22 by way of central valves 20, 21 and corresponding pressure lines. The central valves 20, 21 of the master cylinder 10 come into a closing position as soon as the master cylinder piston 8 slightly moves in the direction of actuation.

Hydraulic communication between the working chamber 16 and the wheel brake 18 is established by way of pressure lines and a 2/2-way valve 23, normally (when de-energized) the 2/2-way valve 23 being open. Further, a 2/2-way valve 24 pressure medium may be tapped from the wheel brake 18 and supplied to the unpressurized supply reservoir 22 by way of a return line 25. Between the working chamber 17 and the wheel brake 19, likewise, a 2/2-way valve 26 is arranged which in terms of design and mode of operation corresponds to the 2/2-way valve 23. By way of a further 2/2-way valve corresponding to valve 25 it is possible to also establish a hydraulic communication between the wheel brake 19 and the unpressurized supply reservoir 22.

Two wheel brake 28, 29 are connected to the pressure chamber 3 of the hydraulic power booster 1. In the connection between the pressure chamber 3 of the hydraulic power booster 1 and the wheel brakes 28, 29 a further 2/2-way valve 30 is arranged which is open when de-energized. It is likewise possible to tap pressure medium for the wheel brakes 28, 29 by way of a normally closed 2/2-way vlave which may be switched into an open position by slip control electronics, pressure medium tapped from the wheel brakes 28, 29 in this way flowing to the unpressurized supply reservoir by way of the return line 25.

A further 2/2-way valve is connected to the pressure chamber 3 of the hydraulic power booster 1. Said 2/2-way valve is likewise controllable by slip control electronics not shown in the drawing an normally adopts a locking position. By way of the 2/2-way valve 32, two inlet valves 33, 34 are pressurizable by the pressure which at a time is prevailing in the pressure chamber 3 of the hydraulic power booster 1. Via the inlet valves 33, 34 communication is established between the working chambers 16, 17 of the master cylinder and the unpressurized supply reservoir 22 as long as the 2/2-way valve is in its rest position or rather as long as there is no lock-up danger. The 2/2-way valves 33, 34 are of identical construction and have a valve seat 35 which may be locked by a closure member 36. The closure member 36 is rigidly connected with a further closure member 38 by means of a connecting rod 37. In the brake's release position shown in the drawing the closure member supports itself at an annular piston 39, the annular piston 39 being biased by a compression spring 40 in the opening direction of the valve passage 35, 36.

The pressure chamber 3 of the hydraulic power booster 1 is connected to a double-seat valve 41, a valve piston being pressurizable by the pressure which at a time is prevailing in the pressure chamber 3 of the hydraulic power booster 1. By way of a connecting rod 43, said valve piston 42 is rigidly connected with a closure member 44. A first compression spring 45 is fixed between the closure member 44 and the housing of the double-seat valve 41. By way of a housing stop 46, said first compression spring 45 normally keeps the valve piston 42 in a defined axial position. By way of a second compression spring 47, an annular member 48 supports itself at the closure member 44. Coordinating with the closure member 44, said annular member 48 forms a valve passage. On the other hand, by way of the second compression spring 47, the annular member 48 may be displaced downwards in the drawing and caused to about on a valve seat 49. As becomes clear from the drawing, the double-seat valve 41 normally establishes a communication between the annular chamber 14 and the upressurized supply reservoir 22.

A valve unit 49 is connected to the 2/2-way valve 32. Valve unit 49 likewise has a valve piston 50. By way of the 2/2-way valve 32, said valve piston 50 is pressurizable by the pressure which at a time is prevailing in the pressure chamber 3 of the hydraulic power booster, provided the non-illustrated slip control electronics have switched the 2/2-way valve 32 into an open position. The valve unit 49 has an inlet 51 which is closed by the annular surface of the valve piston 50 as soon as the 2/2-way valve 32 switches over and the pressure prevailing in the pressure chamber 3 of the hydraulic power booster 1 reaches the valve piston 50. In such an operating condition the pressure force acting on the valve piston 50 moves the valve piston 50 downwards in the drawing, against the force of a compression spring 52. Thereby the inlet 51 is locked hydraulically. The valve unit 49 moreover is in hydraulic comunication with the annular space 13.

In the described brake system a pressure medium pump 53 is provided for the supply of an auxiliary hydraulic energy. Said pressure medium pump 53 charges a pressure medium accumulator 55 by way of a non-return valve 54. The charge of the pressure medium accumulator is monitored by means of suitable measuring instruments (not shown).

In the following, the mode of operation of the described brake system will be explained in more detail, starting from the brake's release position in which all the moving parts of the brake system have adopted the positions shown in the drawing. When an actuating force F is exerted on the brake pedal 4 there results a pressure in the pressure chamber 3 of the hydraulic power booster 1 by way of a brake valve not shown in the drawing, said pressure being proportional to the respective actuating force F exerted on the brake pedal 4. As soon as the pressure established in the pressure chamber 3 of the hydraulic power booster 1 has exceeded a predeterminable level, the valve piston 42 of the double-seat valve 41 is displaced downwards in the drawing, thus the annular member 48 coming to abut on the valve seat 56. The displacement takes place in this manner since the second compression spring 47 is considerably harder than the first compression spring 45. Upon a pressure increase in the pressure chamber 3 of the hydraulic power booster 1 due to an increase in the force acting on the brake pedal 4, finally, the booster piston is displaced in the direction of actuation, after a relatively short displacement travel the central valve 20, 21 closing and thus a pressure build-up being possible in the working chamber 16, 17 of the master cylinder 10. Upon a displacement of the booster piston 2 there will be a decrease in the volume of the annular chamber of the master cylinder 10, part of the volume displaced out of the annular chamber 14 entering the annular space 13. This is effected by way of the valve unit 49 which is open in this operating condition of the brake system. Via a gasket 57 arranged between the master cylinder piston 8 and the booster piston 2, the pressure medium volume not absorbed by the annular space 13 flows to the working chamber 17 of the master cylinder 10 where it flows to the wheel brake 19 by way of the electromagnetically operable 2/2-way valve 26. The flow by way of the gasket 57 continues until the brake circuit connected with the wheel brake 19 has received the required absorption volume. This condition having been complied with, upon a continued displacement of the booster piston 2 of the hydraulic power booster a pressure builds up in the working chamber 17 of the master cylinder 10, thereby also the master cylinder piston 8 moving in the direction of actuation and volume being displaced out of the working chamber 16 towards the wheel brake 18. The brake circuit connected to the wheel brake 18 also having received the required absorption value, there will also be a pressure build-up in the working chamber 16 by means of which the wheel brake 18 may be pressurized.

At this moment, the pressure of pressure chamber 3 of the hydraulic power booster 1 will have reached a level where the valve piston 42 of the double-seat valve 41 will be displaced downwards in the drawing, against the second compression spring. Thus the closure member 44 will lift off from the annular member 48 and reestablish a communication between the annular chamber 14 and the unpressurized supply reservoir 22. The effective surface of the booster piston 2 which participates in the pressure generation in the working chamber 16, 17 will be diminished in that the volume displaced from the annular chamber 14 may flow off, unhindered, towards the unpressurized supply reservoir 22.

Upon appropriate application of a force to the brake pedal 4 a hydraulic presssure may be established in the pressure chamber 3 of the hydraulic power booster; in consequence of said pressure there may result a pressure in the working chambers 17, 16 of the master cylinder 10 which may lead to a lock-up of any one or of several of the vehicle wheels 58, 59, 60, 61. The rotational behavior of the vehicle wheels 58, 59, 60, 61 is monitored by corresponding speed sensors and fed to the slip control electronics not shown in the drawing. As soon as the slip control electronics realize that there is a critical clip valve at any one or at several of the vehicle wheels 58, 59, 60, 61 at first a switch signal is emitted to the 2/2-way valve 32 which, thereupon, adopts an open position and supplies the pressure established in the pressure chamber 3 of the hydraulic power booster to the inlet valves 33, 34. Moreover, the pressure established in the pressure chamber 3 of the hydraulic power booster reaches the valve unit 49 by way of the now open 2/2-way valve 32. Thereby the valve piston 50 moves downwards in the drawing, against the force of the compression spring 52. Thus the inlet 51 is closed by the annular surface of the valve piston 50. After the inlet 51 of the valve unto 49 has been closed the annular space 13 of the master cylinder 10 is locked hydraulically.

By a pressurization of the inlet valves 32, 34 the closure members 36 are displaced to the right in the drawing until they are abutting on the valve seats 35. Following this, the annular pistons 39 contained in the inlet valves 33, 34 are displaced to the right in the drawing, against the force of the compression springs 40, thus hydraulic communication being established towards the working chamber 16, 17 of the master cylinder 10 by way of the 2/2-way valve 32. The pressurization of the working chamber 17 takes place by way of the inlet valve 34 and the double-seat valve 41, the annular chamber 14 being supplied with pressure medium which enters the working chamber 17 by way of the gasket 57. Consequently, during slip control, the working chambers 16, 17 are pressurized by a dynamic pressure. Thus it is ensured that a minimum volume reserve is maintained in the master cylinder.

What is to be considered of particular importance in the afore-described hydraulic brake system is that the double-seat valve 41 temporarily adopts a closing position in the initial phase of braking, in said position the annular chamber 14 being locked hydraulically. This is achieved by an appropriate rating of the compression springs 45, 47 with the compression spring 47 in any case having to have a steeper characteristic line.

By locking the inlet 51 of the valve unit 49, during control, the brake pedal 4 stays in a position which corresponds to the braking force at the beginning of control.

What is claimed is:

1. A hydraulic brake system for automotive vehicles which is provided with a hydraulic power booster having a pressure chamber (3) therein and with a master cylinder operable by the power booster, the booster piston being designed as stepped piston with a pedal-close portion of smaller diameter and with a pedal-remote portion of larger diameter, wherein, together with a housing, the annular surface of the booster piston at the piston step encloses an annular space of variable volume, wherein the annular space is communicating with an unpressurized supply reservoir, which communication can be interrupted, wherein in a pedal-remote pocket bore of the booster piston a master cylinder piston is guided in a sealed manner which confines a working chamber, and wherein an annular chamber confined by the pedal-remote annular surface of the booster piston is pressurizable by the pressure of an auxiliary pressure source, a hydraulic communication being establishable between the annular chamber and the working chamber by way of a non-return valve which opens towards the working chamber, wherein a double-seat valve (41) is arranged between the annular chamber (14) and the unpressurized supply reservoir (22), said double-seat valve (41) temporarily adopting a closed position at the beginning of the braking operation.

2. A hydraulic brake system for automotive vehicles as claimed in claim 1, wherein the double-seat valve (41) is controllable by the pressure established in said pressure chamber (3) of the hydraulic power booster (1).

3. A hydraulic brake system for automotive vehicles as claimed in claim 2, wherein a valve piston (42) is guided in a sealed manner within a bore of the double-seat valve (41), said valve piston (42) being pressurizable by the pressure of the pressure chamber (3) of the hydraulic power booster (1), and wherein a first valve seat (44) is formed fast with the end surface of the valve piston (42) which is averted from the pressure-applied surface, under the action of a force of a first compression spring (45), said first valve seat (44) keeping a closure member (48) at a distance with respect to a second valve seat (56) in the brake's release position.

4. A hydraulic brake system for automotive vehicles as claimed in claim 3, wherein a second compression spring is fixed between the valve piston (42) and the closure member (48).

5. A hydraulic brake system for automotive vehicles as claimed in the claim 4, wherein the second compression spring (47) has a spring constant which is greater than the spring constant of the first compression spring (45).

6. A hydraulic brake system for automotive vehicles as claimed in the claim 5, wherein travel of the valve piston (42) is limited by axial stops.

7. A hydraulic brake system for automotive vehicles as claimed in the claim 1, wherein the space of the double-seat valve (41) which accommodates said first and second compression springs (45, 47) communicates with the unpressurized supply reservoir (22) by way of an inlet valve (34).

8. A hydraulic brake system for automotive vehicles as claimed in the claim 7, wherein the space accommodating said first and second compression springs (45, 47) is pressurizable by way of the inlet valve (34) by the pressure prevailing in said pressure chamber (3) of the hydraulic power booster (1).

9. A hydraulic brake system for automotive vehicles as claimed in the claim 8, wherein a 2/2-way valve (32) is arranged between the pressure chamber (3) of the hydraulic power booster (1) and the inlet valve (34), said 2/2-way valve (32) being electromagnetically controllable by slip control electronics.

10. A hydraulic brake system for automotive vehicles as claimed in the claim 9, wherein the pedal-remote end of the master cylinder piston (8) can be plunged into a further working chamber (16).

11. A hydraulic brake system for automotive vehicles as claimed in the claim 9, wherein two wheel brakes of a first brake circuit are connected to the first working chamber of the master cylinder (10), and two wheel brakes of a second brake circuit being connected to the second working chamber.

12. A hydraulic brake system for automotive vehicles as claimed in the claim 9, wherein each of the working chambers (16, 17) is connected with one wheel brake (18, 19) arranged at the front axle of an automotive vehicle and wherein the wheel brakes (28, 29) of the rear axle are hydraulically communicating with the pressure chamber (3) of the hydraulic power booster (1).

13. A hydraulic brake system for automotive vehicles as claimed in the claim 9, wherein upstream of the wheel brakes (18, 19, 28, 29) valve means (23, 24, 26, 27, 30, 31) are connected which preferably are electrically actuatable and by means of which the pressure in the wheel brakes (18, 19, 28, 29) may be modulated independently of the master cylinder pressure.

* * * * *